Jan. 11, 1927.　　　F. D. HOLDSWORTH　　　1,614,029
TRUCK
Filed Nov. 3, 1921
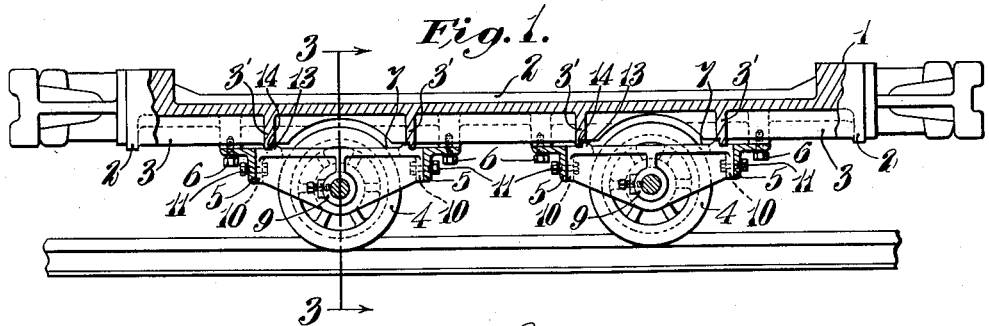
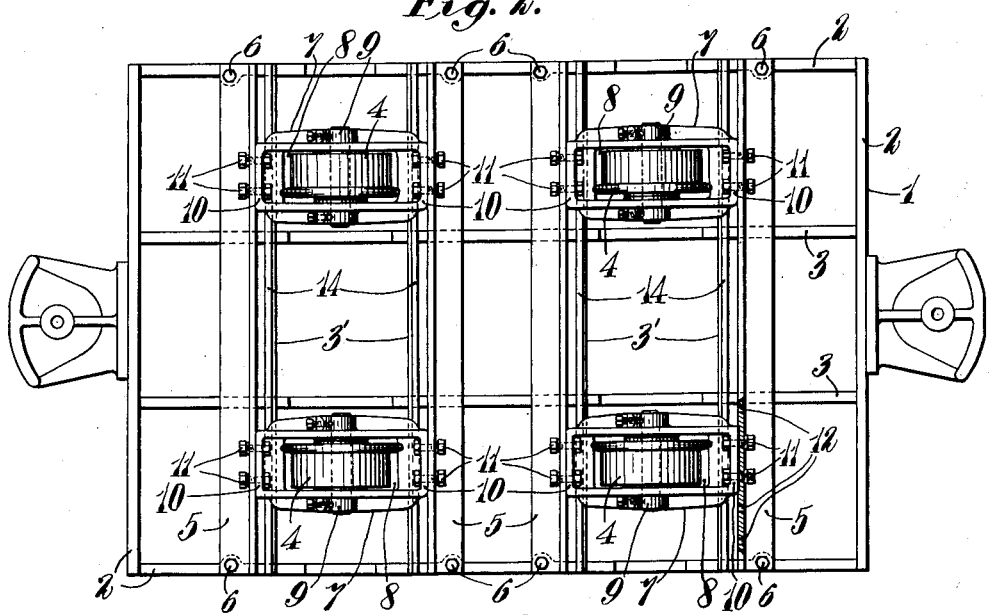
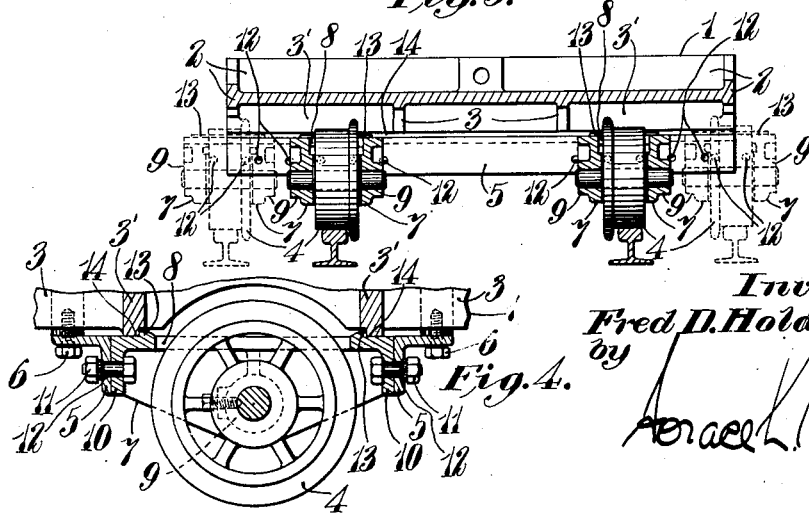
Inventor:
Fred D. Holdsworth,
by
Horace L. ...
Atty.

Patented Jan. 11, 1927.

1,614,029

UNITED STATES PATENT OFFICE.

FRED D. HOLDSWORTH, OF CLAREMONT, NEW HAMPSHIRE, ASSIGNOR TO SULLIVAN MACHINERY COMPANY, A CORPORATION OF MASSACHUSETTS.

TRUCK.

Application filed November 3, 1921. Serial No. 512,673.

My invention relates to trucks.

It has for its object to provide an improved variable gage truck. A further object of my invention is to provide an improved and simplified means whereby trucks of any desired gage may be manufactured at reduced expense and whereby the gage of any given truck may be varied readily and quickly in the field, this at the same time that an exceedingly rugged and strong construction is provided. These and other advantages of my improved construction will, however, hereinafter more fully appear.

In the accompanying drawings I have shown for purposes of illustration one embodiment which my invention may assume in practice.

In these drawings,—

Fig. 1 is a side elevation partially in section of the truck equipped with this form of my invention.

Fig. 2 is a bottom plan view of such a truck.

Fig. 3 is a sectional view on line 3—3 of Fig. 1, the wheels also being shown adjusted in position for a different gage in dotted lines as in a modified construction.

Fig. 4 is a detail longitudinal sectional view showing the wheel connections.

In this illustrative construction, I have shown a truck body 1 which may be of any desired type, herein of the type adapted to carry a mine compressor mechanism and of substantially rectangular form having depending strengthening ribs 2 around its edges and longitudinal and transverse depending strengthening ribs 3, 3', the truck wheels 4 being disposed beneath the truck body 1 and connected thereto in an improved manner hereinafter described.

In my improved construction, on the bottom of the body 1 a plurality of pairs of transversely disposed angle irons 5 is provided, the angle irons each being disposed so that one of its surfaces rests flat upon the bottommost surface of the body 1, and the angle irons herein being attached to the ribs 2 by suitable connecting means herein in the form of screws or bolts 6. As shown the flanges of each pair of angle irons are also preferably turned adjacent one another and extend downward to form a pair of transverse slides herein disposed at opposite ends of the truck body. Mounted in each of these slides is a plurality of wheel carrying units 7 herein in the form of interchangeable, what may be called, wheel yokes having a central longitudinally disposed open space 8 in which the wheels 4 rotate on stub axles secured in depending brackets 9 carried on the sides of the yokes. As shown these yokes are also provided with depending guides 10 receivable between the depending flanges on the angle irons 5 and slidable longitudinally of the angle irons into any desired position between the adjacent members 2 and 3, and these guides are attached to the depending flanges of the angle irons 5 by suitable means, herein in the form of a plurality of bolts 11 which may be received in any of a plurality of perforations 12 cut in the depending flanges of the members 5. Attention is also directed to the fact that the members 7 are also provided with flanges 13 on their upper surfaces and between the guides 10, while means carried by the truck body, herein the transverse strengthening ribs 3', are flanged and grooved as at 14 to cooperate with the surfaces 13 and thereby further stiffen the construction, the greater bulk of the strain being taken on these surfaces so that the principal duty of the connections to the angle irons is to prevent lateral displacement of the members 7.

As a result of my improved construction, it will be noted that it is possible for the wheel carrying members 7 to be adjusted into any desired position between the adjacent members 2 and 3 of the frame, the members 7 being freely slidable relative to the angle irons 5 and the members 3'. It will further be noted that by simply attaching the bolts 11, these members 7 may be rigidly connected to the truck body in any position and that whenever it is desired to alter the gage as for instance in the field, it is only necessary to remove the bolts 11 and adjust the member 7 into the desired position. It should also be noted that as shown in Fig. 3 the members 7 may also be adjusted slightly beyond the lateral limit of the truck body if desired, if the length of the angle irons 5 is suitably increased. Attention is also directed to the fact that my improved construction enables a variable gage truck to be produced which is not only of an exceedingly rugged character and well adapted to the adjustments desired by the manufacturer and user, but which may also be manufactured at small expense.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a truck, a truck body, longitudinally spaced guiding means beneath the bottom thereof, wheel carrying members adjustably mounted on said guiding means for adjustment in directions axially of the wheels relative thereto, and means whereby said members are allowed to be removed by movement directly away from said guiding means.

2. In a truck, a truck body, a plurality of pairs of laterally disposed members beneath the bottom thereof, wheel carrying members mounted between each pair thereof for adjustment transversely of said truck body, and removable means for holding said members in position, said means being necessarily removed during adjustment.

3. In a truck, a truck body, a plurality of pairs of laterally disposed members beneath the bottom thereof, wheel carrying yoke members transversely adjustably mounted between the elements of each pair thereof, and means whereby said yoke members are movable in only one direction at a time while normally positioned between said lateral members.

4. In a truck, a truck body, a pair of laterally disposed members carried on the bottom thereof, wheel carrying members operatively mounted between said members and adjustable transversely of said body, and cooperating engaging surfaces carried on said wheel carrying members and said truck body.

5. In a truck, a truck body, a plurality of pairs of laterally disposed members carried on the bottom thereof, wheel carrying yoke members adjustably mounted between the elements of each pair thereof for movement laterally of said body, and cooperating engaging surfaces formed on said wheel carrying members and said truck body.

6. In a truck, a truck body, a plurality of members attached to the bottom thereof and having parallel depending portions presenting a guideway, wheel carrying members disposed between said depending portions and having portions slidable thereover, and removable means for connecting said portions, said means being necessarily removed during said sliding action.

7. In a truck, a truck body, a plurality of members attached to the bottom thereof and having parallel depending portions presenting a guideway, wheel carrying members disposed between said depending portions and having portions on their opposite ends slidable thereover and portions intermediate their ends engageable with the bottom of said body, and means for connecting said wheel carrying members to the depending portions.

8. In a truck, a truck body, longitudinally spaced guiding means between the ends thereof, and wheel carrying members fixed as to having a longitudinal component of movement relative to said body by said means and adjustable laterally therebetween.

9. The combination with a truck body having laterally adjustable wheel supports therefor and detachable guiding means therefor, of means for allowing said supports to be moved to any required position relative to said guiding means including means necessarily removable from said device during adjustment, said latter means being adapted to substantially rigidly hold said wheel supports when in adjusted position and to positively prevent lateral displacement thereof.

10. The combination with a truck body having laterally adjustable wheel supports, of means for holding the same in substantially rigid position including a nut and bolt connection, and means independent of said connection for preventing longitudinal displacement of said supports after being positioned in any required adjusted position.

11. The combination with a truck body having wheel supports and means for engaging the latter, of means for permitting adjustment of said wheels axially while preventing displacement of said supports laterally of the wheel axes, and means for holding the same in rigid position with respect to said body, said last mentioned means including only a bolt and nut connection cooperating with said engaging means and supports.

12. The combination with a truck body having wheel supports therefor, of means for rigidly holding the same in position including relatively removable cooperating members, and means independent of cooperation between said members for permitting adjustment of said wheels axially while preventing displacement of said supports laterally of the wheel axes.

13. In a truck, a truck body having transversely extending flanges thereon, transversely extending guides secured to said body, wheel supports having portions thereof cooperating with said flanges and adjustably mounted in said guides, and means for securing said supports on said guides.

14. In a truck, a truck body having parallel guides and flanges thereon, a wheel support adjustably mounted in said guides and having portions cooperating with said flanges, and means for securing said support to said guides.

15. In a truck, a truck body having transverse flanges thereon, spaced guiding means secured to said body, wheel supports adjustably mounted between said guiding means and having flanges cooperating with said flanges to prevent longitudinal displacement thereof, and means for securing said supports to said guiding means.

16. In a truck, a truck body having a depending transverse flange thereon, transversely disposed members secured to said body, a laterally adjustable unitary wheel support, and means cooperating with said members for clamping said support in rigid relation against said flange.

17. In a truck, a truck body having transversely grooved depending flanges, transversely extending angle members secured to the bottom of said body, unitary wheel supports disposed between said angle members and having projections thereon cooperating with the grooves in said flanges, and means for securing said supports to said angle members in different laterally adjusted positions.

In testimony whereof I affix my signature.

FRED D. HOLDSWORTH.